United States Patent [19]
Gentry

[11] 4,400,037
[45] Aug. 23, 1983

[54] WHEEL STABILIZING DEVICE

[76] Inventor: Herbert H. Gentry, 12451 Russell Cir., Garden Grove, Calif. 92643

[21] Appl. No.: 281,570

[22] Filed: Jul. 9, 1981

[51] Int. Cl.³ .................................................. B60B 13/00
[52] U.S. Cl. ................................. 301/5 BA; 74/573 R
[58] Field of Search ........................... 301/5 B, 5 BA; 74/573 R, 573 F

[56] References Cited

U.S. PATENT DOCUMENTS

| | | | |
|---|---|---|---|
| 1,474,845 | 11/1923 | Parr | 74/573 |
| 2,895,766 | 7/1959 | Leopold | 74/573 |
| 2,901,290 | 8/1959 | Loofbourrow | 301/5 BA |
| 3,012,820 | 12/1961 | King | 301/5 BA |
| 4,178,041 | 12/1979 | Rush | 74/573 R |

*Primary Examiner*—H. Grant Skaggs
*Attorney, Agent, or Firm*—Francis X. LoJacono

[57] ABSTRACT

A wheel-stabilizing device in combination with a vehicle wheel, wherein the stabilizing device provides a dynamic spring-loaded elastic mass, the mass being attached to the wheel. This device produces an elastic gyroscopic force that is increased as the rotational speed of the wheel increases, thereby progressively augmenting the stabilization of the inherent gyroscopic forces in the wheel, as the wheel rotates about its horizontal axis.

5 Claims, 6 Drawing Figures

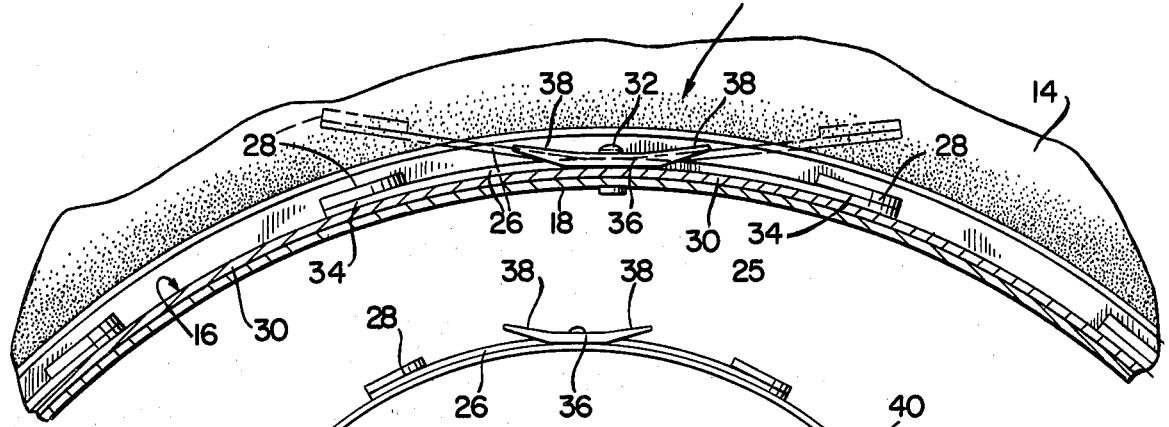
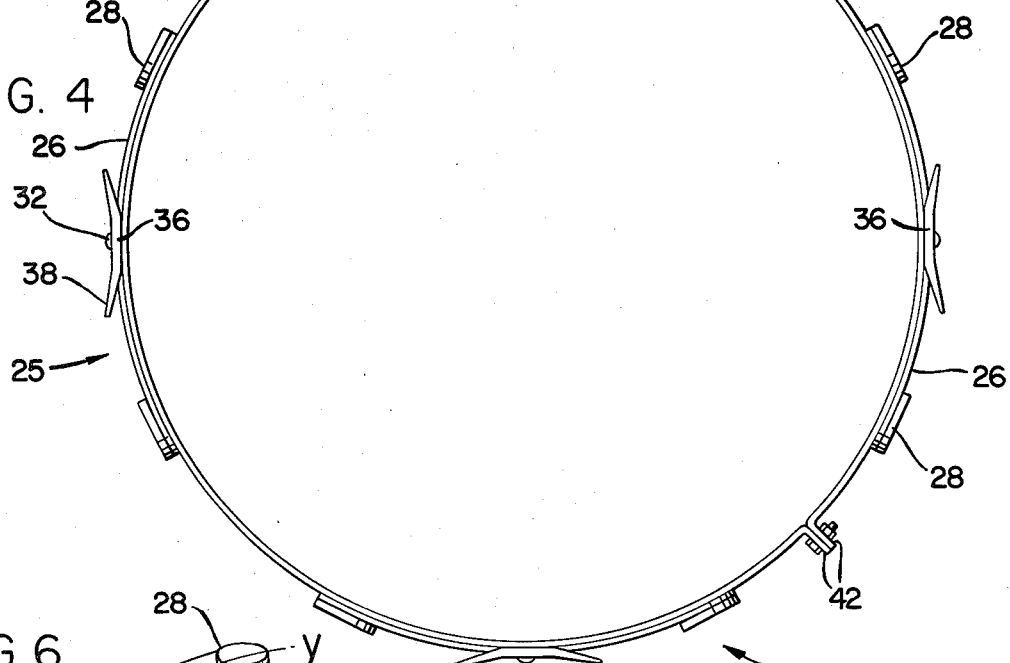
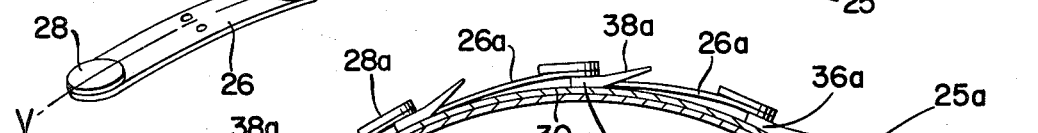
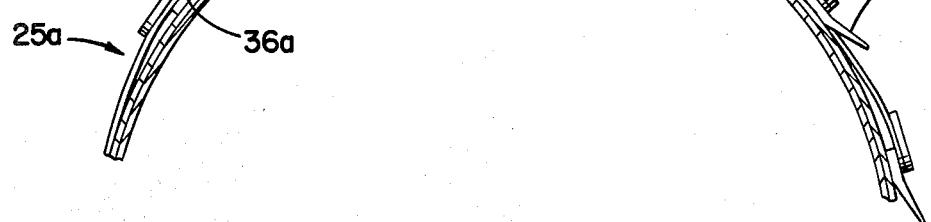

WHEEL STABILIZING DEVICE

BACKGROUND OF THE INVENTION

1. Field of the Invention

This invention relates generally to a stabilizing device, and more particularly to a device that establishes a variable elastic gyroscopic stabilizing force adapted for use with vehicle wheels.

2. Description of the Prior Art

It is well known in the art that various problems and diffulties are being encountered in providing suitable means for stabilizing the three principle axes of a rotating wheel, i.e, the spinning axis, the horizontal axis and the vertical axis.

Most known devices direct themselves to attachments that attempt to effect a balancing condition, rather than a stabilizing condition. That is, a balancing device comprises a balancer weight that is capable of shifting to compensate for an out-of-balance condition of a wheel. In effect, the known devices are counter-balance units, and do not establish any control over the stabilization of the rotating wheel.

As examples of the known art, the following United States Patents disclose various balancing devices.

U.S. Pat. No. 2,901,290 discloses a wheel-mounted vibration damper to provide a tuned dynamic absorber to dampen vibrations that are transmitted by the wheel of a motor vehicle. The damper comprises a plurality of resilient elements mounted to the inner wheel rim. The resilient elements bear against a frictional ring which is preloaded against an inertia ring that surrounds and is seated on the ring of a frictional material. Thus, the resiliently suspended ring mass is arranged to absorb the wheel vibration, and is not affected by the rotational speed or gyroscopic forces of the wheel.

A wheel balancer is disclosed in U.S. Pat. No. 3,012,820 which comprises a weight in the nature of a solid ring substantially concentric with the axis of rotation of the wheel, the weight being freely supported in a case so as to continuously be relocated to compensate for any imbalance in the wheel. Thus, in response to the reactive forces, the weight—by virtue of its inherent mass and consequent inertia—will instantly shift within the case to a position eccentric to the axis of rotation of the wheel.

U.S. Pat. No. 4,178,041 discloses a wheel-balancing device that is incorporated in a hub and conical disc which, when acted upon by centrifugal force during wheel rotation, will move axially toward the wheel, in order to radially load the rim and displace same into forceful contact with the wheel periphery.

The above-noted device and other known balancing means have overlooked the basic need for stabilizing wheels. When a wheel is stabilized, any imbalance therein is automatically corrected by the compensating factor of stability, and not the compensating factor of shifting a weighted force to react against an unbalanced location at a given point on the wheel.

SUMMARY OF THE INVENTION

The present invention has for an important object to provide a stabilizing means rather than a balancing means, wherein the stabilizing means comprises a plurality of spring-loaded weights positioned preferably within the wheel structure, each weight being attached at the free end or ends of a fixed leaf spring, whereby the weight will expand outwardly from the axis of rotation of the wheel. The distance between the weight and the axis of rotation is determined by the rotational speed of the wheel.

Another object of the present invention is to provide a wheel stabilizer that—when applied to a typical vehicle wheel—will create a resistance to horizontal and vertical torque on the wheel, and thereby maintain a uniform linear orientation. Thus, when a wheel is rotated about its vertical axis, the gyroscopic force of the rotating wheel can be compensated for by the reacting forces of the stabilizer elements. Not only will the spring members lift outwardly with the weights as the wheel rotates, but the weight and spring will twist counter to the rotating movement of the wheel about its vertical axis—this not being possible with the known wheel-balancing devices.

Still another object of the invention is to provide a stabilizing device which comprises a plurality of individual elastic mass elements that are equally spaced apart and affixed to a peripheral area of a wheel, in order to establish a consistent resistance to vertical deflection of a wheel when the tire footprint thereof is forced upward by an uneven road surface.

It is still another object of the invention to provide a stabilizer of this character that creates directional stability by resisting the hunting action of the front wheels due to uneven road surfaces, crosswind, etc.—resulting also in less driver fatigue, and allowing longer tire life under most road and mechanical conditions, with the exception of front-end misalignment.

A further object of the invention is to provide a device of this character that can be installed directly to the wheel structure, or that can be added to existing wheel structures with the same end results.

It is a further object of the present invention to provide a device of this type that has few operating parts, and is easy to maintain.

Still a further object of the invention is to provide a wheel stabilizer that establishes positive tire traction, and allows for increased cornering speed; and, when used on aircraft, to prevent or delay hydroplaning on take off and landing, and reduce the danger of rubber reversion.

And still a further object of the invention is to provide a device of this character that is relatively inexpensive to manufacture, yet is simple and rugged in construction.

The characteristics and advantages of the invention are further sufficiently referred to in connection with the accompanying drawings, which represent one embodiment. After considering this example, skilled persons will understand that variations may be made without departing from the principles disclosed; and I contemplate the employment of any structures, arrangements and modes of operation that are properly within the scope of the appended claims.

BRIEF DESCRIPTION OF THE DRAWINGS

Referring more particularly to the accompanying drawings, which are for illustrative purposes only:

FIG. 3 is a cross-sectional view taken substantially along line 3—3 of FIG. 2, wherein the spring and weight are shown in an extended position in phantom lines;

FIG. 4 is a side-elevational view of an alternative arrangement, showing the elastic mass elements being secured to a separate ring member for attachment to a vehicle wheel;

FIG. 5 is a cross-sectional view of an alternative arrangement, wherein the elastic mass elements comprise a fixed end and a free end including a weight affixed thereto; and FIG. 6 is a perspective view of a stabilizer unit.

DESCRIPTION OF THE PREFERRED EMBODIMENT

Figure 1:
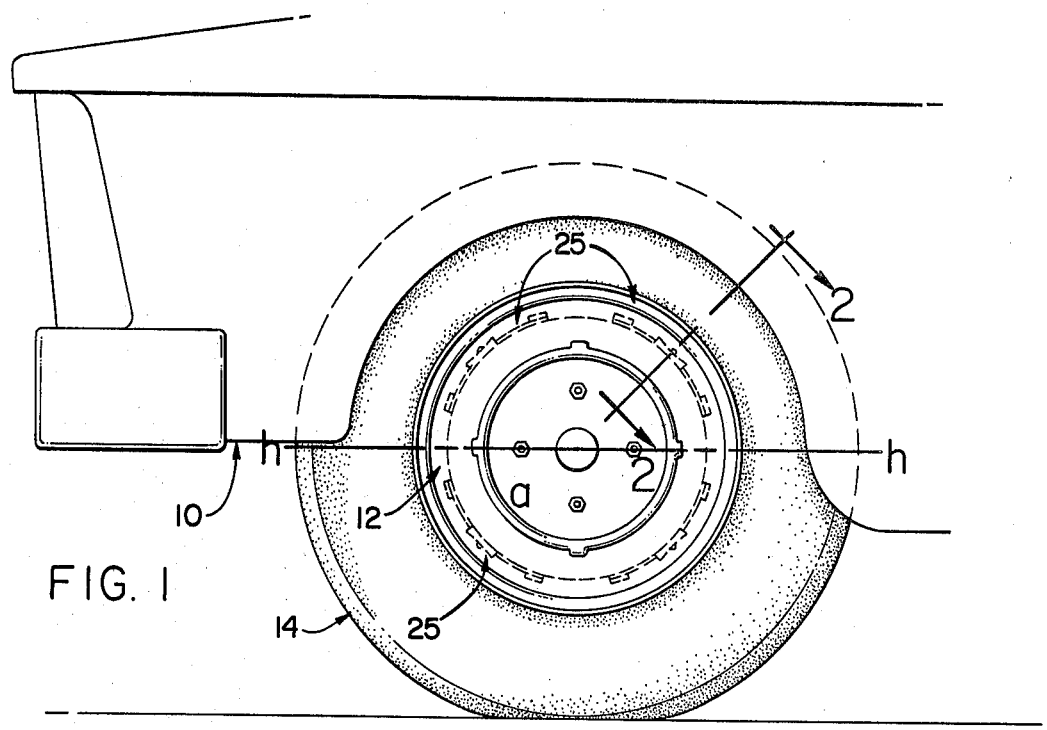
FIG. 1 is a side-elevational view of a motor-vehicle wheel, with the present invention shown mounted thereon in the preferred location.
Figure 2:
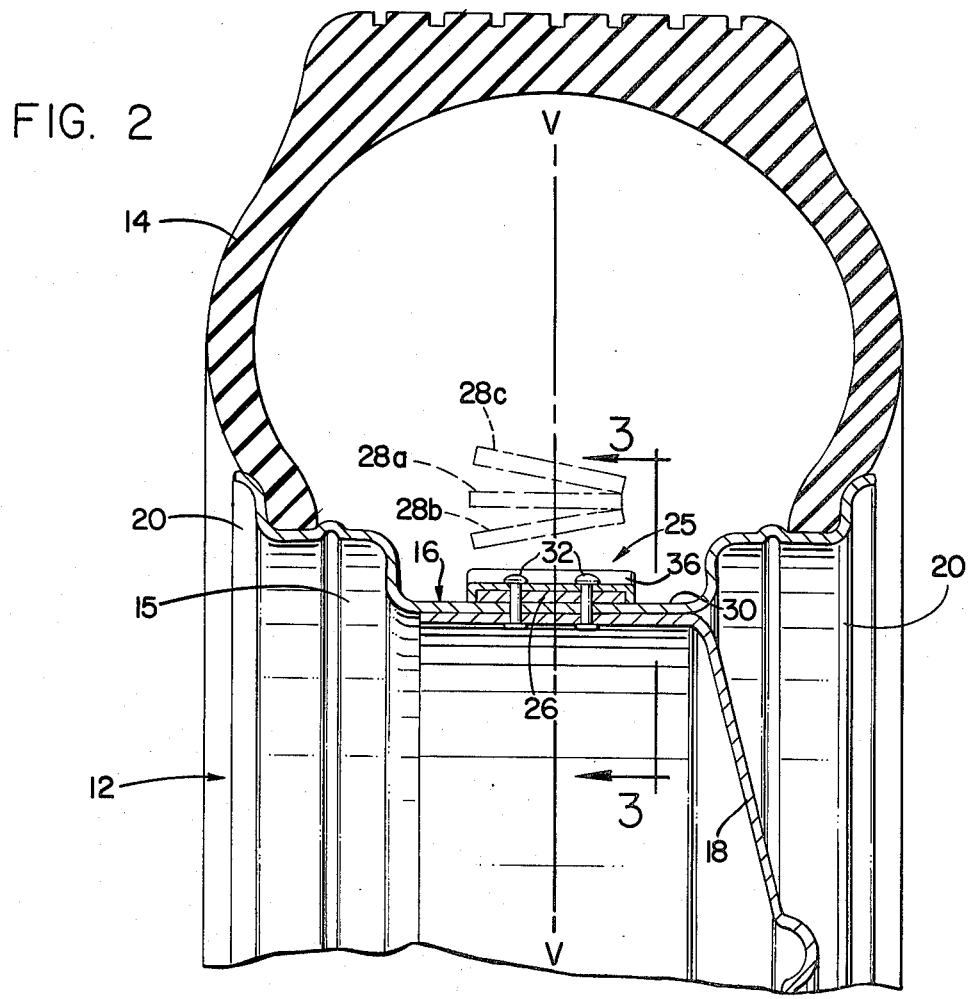
FIG. 2 is an enlarged cross-sectional view taken substantially along line 2—2 of FIG. 1, showing the elastic mass mounted to the annular central channel of a wheel, whereby the device is enclosed within the wheel and its associated tire.

Referring to FIGS. 1 through 3 and more particularly to FIG. 1, there is shown a vehicle, generally indicated at 10, having a typical front wheel 12 including an inflatable pneumatic tire 14 mounted to the vehicle wheel 12 in a well-known manner. It should be understood that the combination of the wheel and tire, when rotated about the spinning or rotating axis a, establishes an inherent gyroscopic reaction whereby the torque on the rotating wheel assembly causes a precessional motion about axis a. Wheel 12 is generally connected to the vehicle by a suspension system (not shown) which allows the wheel to be maneuvered or rotated about its vertical axis v—v, and up and down from its horizontal axis h—h. Thus, any movement of the wheel counter to the gyroscopic precessional moment established by the rotational inertia will be resisted. The present invention as herein disclosed is designed to be formed in combination with a vehicle wheel to reduce or overcome such resistance, so as to provide a continuous stabilized wheel as the vehicle turns corners or traverses rough surfaces.

The wheel 12 as herein shown and described is provided as an example, which is well understood in the art. Of course, there are varied wheel configurations, such as those used in passenger vehicles, trucks, trailers, aircraft, etc.

The basic wheel comprises a rim 15 having a central recessed annular channel 16 to which is generally attached a rim-support plate 18, the tire 14 being mounted to the side annular flanges 20. Thus, the typical air chamber 22 is defined between rim 15 and tire 14.

The present invention comprises a plurality of individual stabilizer units, generally designated at 25, each of which is secured to the central channel 16 of wheel 12 in a spaced relationship longitudinally about the inner periphery thereof. The number of stabilizer units will be determined by the circumference of the wheel.

Each stabilizer unit 25 comprises at least one resilient member 26, and at least one weight means 28 mounted to the resilient member, wherein the combination of the two components defines an elastic mass which reacts to the inertia imparted by the rotation of the wheel about spin axis a, i.e., the wheel's acceleration.

The resilient member 26 is defined as an elongated leaf-spring member which is secured to rim 15. Preferably, the stabilizer unit 25 would be located conveniently as close to the outer periphery of the wheel; and thus the optimum location on the wheel would be within the annular channel 16, whereby the expanding reaction of the weights and springs is protected within the air chamber 22. This arrangement provides the wheel with a variable rotational inertia or moment of inertia. Since rotational inertia is measured by the sum of the products of the masses of body (weight) and the square of their distance from the axis of rotation, it thus will be understood how the arrangement of the equally spaced units will provide a variable gyroscopic force relative to the speed of the vehicle.

Leaf spring 26 is shown secured to the bottom wall 30 of channel 16 by a pair of rivets 32. However, any suitable securing means such as bolts, spot welds, etc., can be readily substituted. In the embodiment as shown in FIGS. 1 through 3, the leaf spring is attached between the intermediate free ends 34, the weights 28 representing the mass attached to the respective free ends. Thus, as wheel 12 spins about its axis of rotation, weights 28 tend to move outwardly from axis a, as seen in phantom lines in FIG. 3.

Since weights (masses) are affixed to free ends 34, the leaf spring will bend upwardly adjacent both sides of the fixed central point. Accordingly, as the torque on the rotating wheel increases, the weights will extend outwardly further from the axis of rotation a held by leaf spring 26. However, in order to prevent spring 26 from overextending and bending excessively, there is provided a limiting means defined by a limiting cap member 36 having upwardly inclined flanges 38, whereby the free portions of spring 26 engage the respective flanges 38 which limit the upward movement of the weights.

It should be further noted that, as the wheel rotates and is directed in a straight path, weight (mass) 28a will conform to a horizontal position normal to axis v—v. (See FIG. 2.) However, when the wheel is rotated about axis v—v, the mass will assume an angular displacement. That is, if wheel 12 is rotated to the left about axis v—v as it is spinning about axis a, the weight indicated at 28b will shift to an opposite angular position about its longitudinal axis y—y, in order to compensate for the left turn. Transversely, weight 28c will be angularly displaced in an opposite direction to compensate for the lateral force established by the turning of wheel 12 to the right. Hence, the wheels are automatically counterbalanced as the vehicle makes a turn in any given direction, such as traversing a curve in a roadway or street. A stabilizing effect is thus created, allowing the vehicle to take a curve at a much higher speed, and providing a fully controlled steering condition heretofore not possible at high speeds—whereby the wheels are readily brought back to a certerline track.

Referring to FIG. 4, there is shown an alternative arrangement of the present invention, wherein the stabilizer units 25 are secured to an annular band or stay 40. As previously described, each unit 25 is secured in a suitable manner to the band, and the band is mounted to the wheel, preferably in channel 16 thereof. This is accomplished by providing band 40 with interattaching flange ends 42. Band 40 is positioned in channel 16, and is secured in place by bolt 44 adapted to be received in flange end 42, thus defining a securing means. The action of the units will be the same as described above. Hence, any vehicle wheel now in use can be provided with the stabilizing means.

The assembly illustrated in FIG. 5 is another embodiment of the present invention. However, in this arrangement, the stabilizer unit 25a comprises a resilient member 26a which is affixed in a suitable manner at one end thereof, the opposite end thereof having a weight 28a secured thereto. Thus, only one end will flex and extend outwardly from the rotating axis. The fixed end again is provided with a limiting means defined by cap member 36a having an inclined flange 38a. The upward extension and bending action are controlled by the inclined flange member 38a.

The invention and its attendant advantages will be understood from the foregoing description; and it will be apparent that various changes may be made in the form, construction and arrangement of the parts of the invention without departing from the spirit and scope thereof or sacrificing its material advantages, the arrangement hereinbefore described being merely by way of example; and I do not wish to be restricted to the specific form shown or uses mentioned, except as defined in the accompanying claims.

I claim:

1. A wheel-stabilizing device in combination with a vehicle wheel, comprising:
   a vehicle wheel having an annular rim;
   a plurality of stabilizing means attached to said rim in spaced relationship to each other, wherein together said stabilizing means define an elastic mass that traverses inwardly and outwardly from the spinning axis of the wheel relative to the inertia imparted by the rotating wheel;
   each of said stabilizing means comprising:
   a resilient member secured to said rim and adapted to flex outwardly from the fixed point thereof; and
   a mass attached to at least one end of said resilient member;
   wherein said resilient member comprises an elongated, flat, leaf-spring member having oppositely disposed free ends, said leaf spring being secured intermediate said free ends; and wherein said mass comprises:
   a first weight member attached to one free end; and
   a second weight member attached to the opposite free end, whereby the free ends will bend outwardly together as said wheel rotates about the spinning axis thereof;
   means for attaching said stabilizing means to said wheel; and
   means for limiting the outward movement of said elastic mass.

2. The combination as recited in claim 1, wherein said limiting means comprises a cap member centrally attached over said leaf-spring member, thereby limiting the upward bend of said free ends of said leaf spring.

3. The combination as recited in claim 2, wherein said cap member includes oppositely disposed and angularly inclined flanges adapted to be engaged by said free ends of said leaf spring.

4. The combination as recited in claim 1, wherein said resilient member is adapted to twist about its longitudinal axis in an opposite direction from the rotation of said wheel about its vertical axis.

5. The combination as recited in claim 1, wherein said means for attaching said stabilizing means comprises:
   an annular band, wherein said resilient members of each stabilizing means are attached to said annular band, said annular band being removably secured to said rim of said wheel.

* * * * *